United States Patent [19]

Locicero

[11] Patent Number: 4,676,344
[45] Date of Patent: Jun. 30, 1987

[54] SELF-LOCKING CHOCKS FOR A SEMI-TRAILER

[76] Inventor: Frank J. Locicero, 10 Ellen Ct., Wayside, N.J. 07712

[21] Appl. No.: 680,964

[22] Filed: Dec. 12, 1984

Related U.S. Application Data

[63] Continuation of Ser. No. 503,558, Jun. 13, 1983, abandoned.

[51] Int. Cl.⁴ .................................. B60T 1/14
[52] U.S. Cl. ........................ 188/32; 188/4 R
[58] Field of Search ............... 188/32, 62, 44, 196, 188/4 R; 410/30, 15, 19, 20, 21, 65, 22, 9, 10, 11, 12; 414/401, 584

[56] References Cited
U.S. PATENT DOCUMENTS 2,585,126 2/1952 Holland ............................ 188/32
3,425,517 2/1969 Speir ................................ 188/32

Primary Examiner—Duane A. Reger
Assistant Examiner—Alvin Oberley
Attorney, Agent, or Firm—Wegner & Bretschneider

[57] ABSTRACT

Disclosed is an automatically self-locking chock for semi-trailers parked in a truck loading yard having: A freely movable dolly platform above a load support member; at least one pair of pivoted chock plates at a distance from the platform such that the dolly support for the forward end of the trailer will rest on the platform when the chock plates are positioned next to the wheels of the trailer; a lever member connecting the platform to the chock plates, constructed such that when the platform carries a load and is pressed against the load support member the chock plates are pivoted upward against the treads of the trailer wheels by mechanical magnification of the downward movement of the platform; and a positioning member for holding the lever member, when the platform is unloaded, in a position such that the chock plates are parallel to and approximately in the plane of the roadbed on which the trailer rests and the dolly platform is positioned above and away from the load support member.

7 Claims, 5 Drawing Figures

SELF-LOCKING CHOCKS FOR A SEMI-TRAILER

This application is a continuation of Ser. No. 503,558, filed June 13, 1983 now abandoned.

This invention relates to chocks for the wheels of semi-trailers for immobilizing such semi-trailers when they are parked in a truck yard against a loading platform. More specifically, it relates to a chock mechanism which, actuated by the weight of the parked semi-trailer, automatically immobilizes the latter in place but which can be released by the action of engaging a tractor unit which takes over the weight load.

More specifically, this invention relates to an automatically self-locking chock for semi-trailers parked in a truck loading yard, which comprises, in combination (a) a freely movable dolly platform above a load support means;

(b) at least one pair of pivoted chock plates at a distance from said platform such that the dolly support for the forward end of said trailer will rest on said platform when said chock plates are positioned next to the wheels of said trailer;

(c) lever means connecting said platform to said chock plates, constructed such that when said platform carries a load and is pressed against said load support means said chock plates are pivoted upward against the treads of said trailer wheels by mechanical magnification of the downward movement of said platform; and (d) positioning means for holding said lever means, when said platform is unloaded, in a position such that said chock plates are parallel to and approximately in the plane of the roadbed on which the trailer rests and said dolly platform is positioned above and away from said load support means.

BACKGROUND OF THE INVENTION

Trailer trucks form one of the major components of the goods transportation system in modern commerce. In the most common rig, a motorized tractor unit pulls a freight carrying semi-trailer unit. The latter rides on a set of wheels, usually two or more to a side, supporting the rear end. The front end rests on a pivot on the tractor unit. Behind the pivot, the semi-trailer has a small dolly, usually wheeled, which normally is too short to reach the ground or is folded up under the bottom of the semi-trailer. When the tractor is being detached the dolly is unfolded or lowered by ratchets so that the front end of the semi-trailer is supported and the tractor can disengage.

Such semi-trailers are customarily loaded and unloaded in truck yards in which a series of parking lanes are perpendicular to a loading platform or dock the same height as the floor of the semi-trailer. When the latter is backed against the loading platform goods can be mechanically loaded or unloaded by such machines as fork lifts which run right into the semi-trailer. For this reason it is necessary that the semi-trailer be properly immobilized, during the operation, by chocking the wheels.

When a semi-trailer is backed up to a loading platform, the driver, as of now, must perform a number of operations. The tractor must be disconnected (requiring the dolly to be lowered) and then driven away. As a separate operation, the wheels of the trailer must be blocked by large wooden chocks manually pounded into the angle between the tires and the pavement. When a trailer is to be hauled away these steps must be reversed. Chocking the wheels requires a measurable amount of the driver's valuable time and effort. Further, the chocks are usually made of wood and are expensive. They wear out and must be replaced several times a year. They also serve as a standing temptation for pilferage, since drivers are always in need of such chocks for emergency use. There is thus a strong economic need for a device which will automatically chock the wheels of a parked semi-trailer.

Some of the same or allied problems arise with recreational camper and boat trailers. In particular, the smaller trailers do not have good brakes and can easily run away when parked. Also, dealers and the like have a need for a method of effectively immobilizing such vehicles on their lots.

STATEMENT OF THE INVENTION

The present invention is an automatic self-locking chock mechanism wherein the weight of the dolly of a semi-trailer automatically operates, through a set of levers beneath the roadbed, to raise a set of pivoted plates against the wheels of the semi-trailer and thus chock them. Only reconnection of the tractor unit and retraction of the dolly, thus transferring the weight of the semi-trailer to the tractor, will release the chocks.

ADVANTAGE OF THE INVENTION

It is an advantage of this invention that it is purely mechanical and is not subject to the loss of chocking to which an electrically operated system would be subject by power failure. It is a further advantage that the action is automatic, actuated by the normal act of parking a semi-trailer, and does not require separate action by the driver. It is also advantage that the cost of replacing wooden block chocks has been eliminated, whether they are worn out or "borrowed".

DESCRIPTION OF THE INVENTION

This invention can be further understood with reference to the figures, in which FIG. 1 is a partially sectional side elevation of the mechanism immobilizing a semi-trailer parked against a loading platform;

Figure 1:
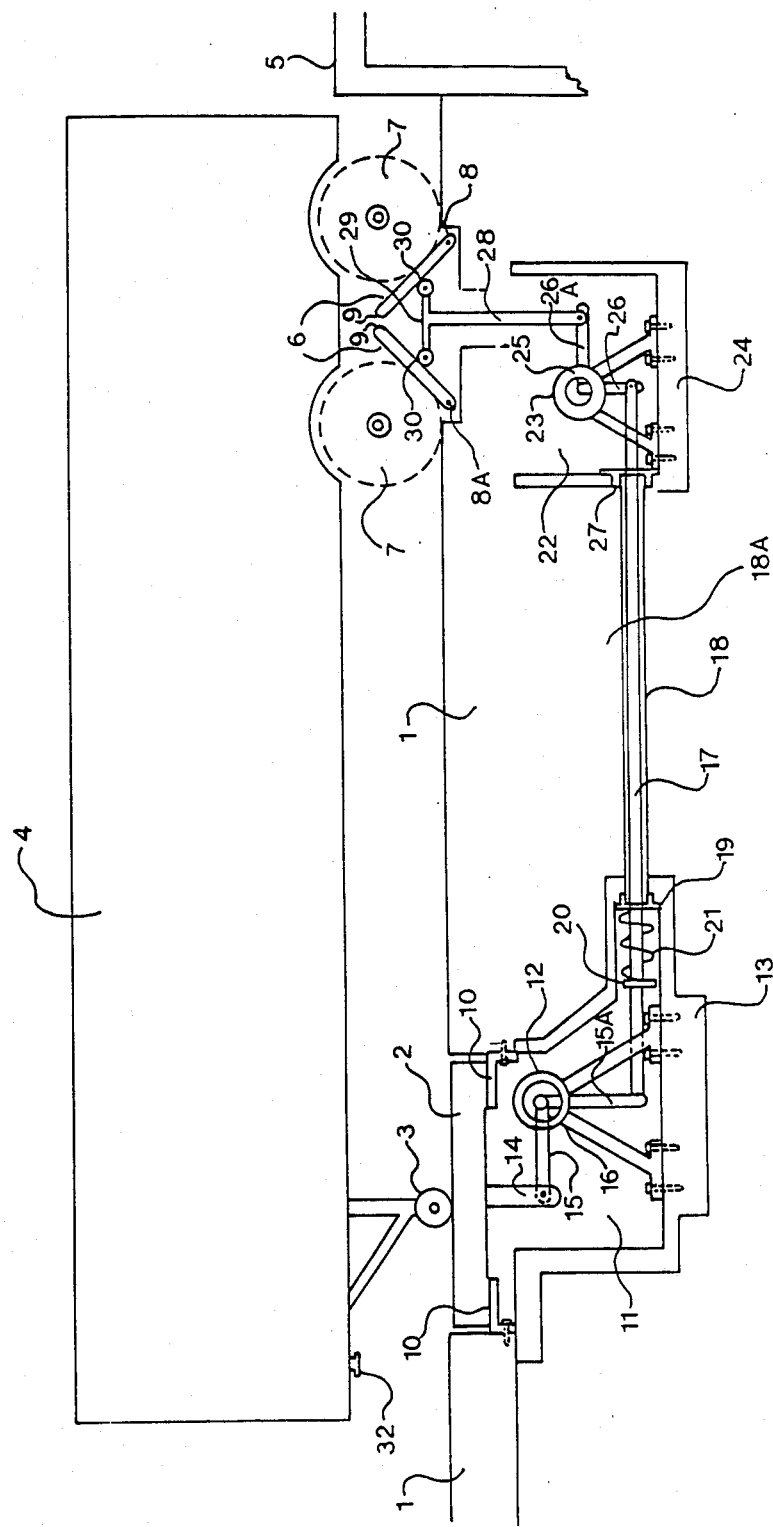

More specifically, the roadbed 1 of a lane in a truck yard has in its surface a dolly platform 2, freely movable with relation to roadbed 1, on which, as shown in FIG. 1, the dolly wheel 3 of a semi-trailer 4 rests. The rear end of the semi-trailer 4 is close to a loading platform 5. Also set in the roadbed 1 is a pair of chock plates 6, shown in FIG. 1 in locked position against the wheels 7 of semi-trailer 4. Chock plates 6 are each pivoted at one edge. The chock plate 6 nearest the loading platform 5 is pivoted along the edge 8 nearest said loading platform. Its companion plate is pivoted along the opposite or forward edge 8A. The chock plates 6 are located in the roadbed 1 such that the meeting free edges 9 of the chock plates are at the center of the normal resting position of semi-trailer's wheels 7 when a semi-trailer is backed up to the loading platform 5.

Dolly platform 2 rests, when loaded as shown in FIG. 1, on dolly load supports 10, shown here as angle irons bolted to roadbed 1. Beneath the dolly platform 1 is a dolly platform pit 11, in which a dolly lever support 12 is bolted to a concrete floor 13 in said pit 11. A vertical platform bar 14 is fixed either rigidly or pivotably to dolly platform 2 and is pivotably attached to the short arm 15 of a rigid angular lever or bell crank 16. The bell crank is journaled in the dolly lever support 12 at the angle. The longer arm 15A of lever 16 is pivotably attached to the end of a pit connection rod 17. Pit connection rod 17 passes through the underlying soil 18A in a passage line 18, to which a flange is threaded. Rod 17 was affixed thereto a spring plate 20, which can be welded on it or held by a snap-ring. Between plate 20 and flange 19 is a compression spring 21 which, in the absence of a load on platform 2 tends to push rod 17 to the left and therefore pushes platform 2 up.

Beneath chock plates 6 is a second or chock plate pit 22 in which a chock lever support 23 is rigidly affixed by bolting to the concrete floor 24. A chock lever bell crank 25, angled and having arms 26 and 26A of different lengths, is journaled at the angle in said chock lever support. Pit connecting rod 17 projects into said chock plate pit through a flange 27 screwed on the passage liner 18. The end of pit connection rod 17 is pivotably connected to the shorter arm 26 of chock lever 25. The longer arm 26A is pivotably connected to a vertically positioned chock bar 28 at the top of which is fastened a horizontal chock support 29 at the ends of which are rollers 30. Rollers 30 are mounted to rotate along an axis transverse to the length of the semi-trailer and support chock plates 6 against the trailer wheels 7, blocking them from movement.

Access to pits 11 and 22 is via manholes 31 (see FIG. 2) permitting repairs as needed to the mechanism of this invention. In constructing this invention, pit connection tube line 18 is conveniently inserted by the use of well drilling machinery operating horizontally. Pit connection rod 17 is inserted from one pit, in short lengths, with new lengths fastened by threading or other convenient means. Preferably the lengths are not welded, in order to facilitate repair of rod 17. The pits 11 and 22 are lined to prevent cave in by dirt 18A, preferably with concrete or wood. Likewise, the outer lining 18 of the passage between the pits should be inserted in sections for convenience.

OPERATION FOR THE INVENTION

In the operation of this invention, the semi-trailer 4 is backed into a lane in the truck yard and up to a loading platform 5 by a tractor unit attached via towing pivot 32. The dolly wheels 3 of the semi-trailer 4 are lowered to the ground and take the weight of the trailer, permitting the tractor unit to be driven away. Dolly wheel 3 now rests on dolly platform 2 with the full weight of the trailer on it. Platform 2 sinks under this weight until it rests on supports 10. In sinking, it pushes dolly bar 14 down, which in turn rotates dolly lever 16 at the journal in dolly lever support 12, causing a horizontal push by arm 15A to be imposed on connection rod 17. This push compresses spring 21. Rod 17 in turn pushes lower arm 26 of chock lever 25, causing lever 25 to rotate at the journal in chock lever support 23. The upper arm 26A of chock lever 25 pushes chock bar 28 upward. As chock support 29 rises, chock plates 6, riding on rollers 30, rise to lock wheels 7 in place.

CONSTRUCTION SPECIFICATION

Dolly lever 16 and chock lever 25 can have arms of any convenient angle. However, the closer the angle is to a right angle, the more efficient will be the mechanical advantage. The differences in length between arms 15 and 15A and between 26 and 26A mechanically magnify the downward motion of platform 2 into a much larger upward motion of chock support 29. Thus, if 15A is twice the length of 15 and 26A is twice the length of 26, the upward movement of bar 25 will be four times the downward movement of bar 14.

Figure 4:
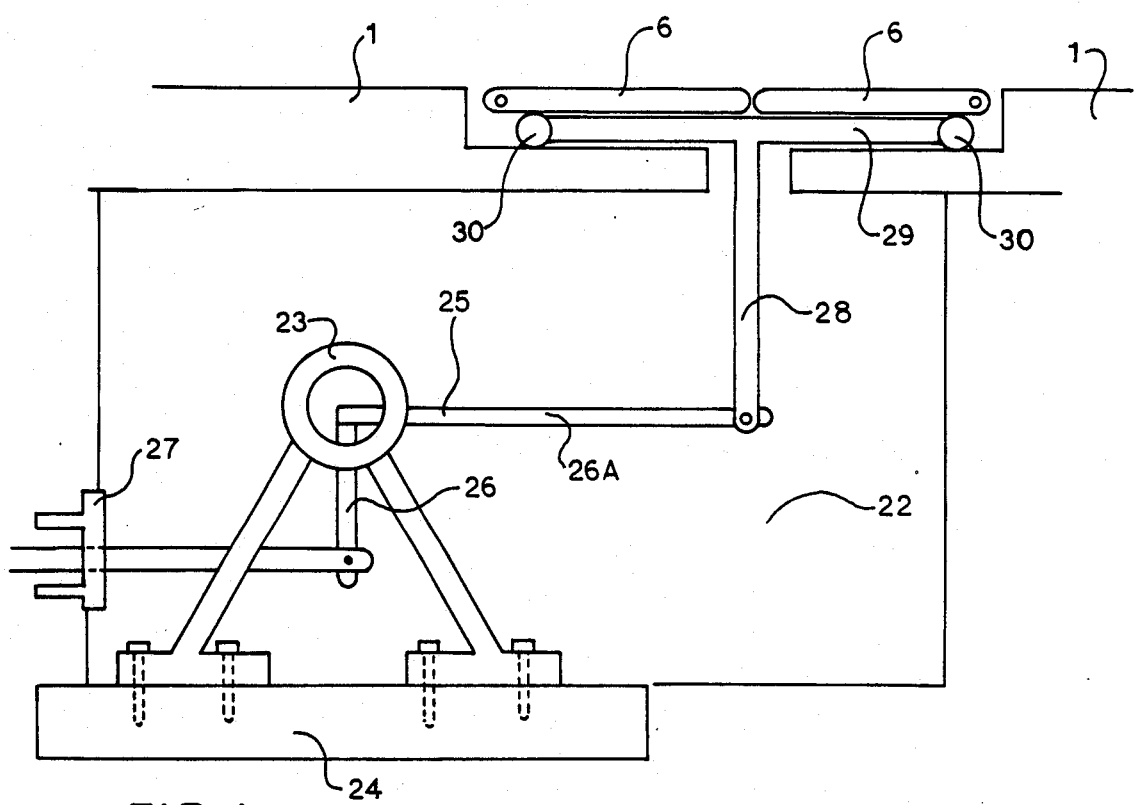
FIG. 4 is a detailed side elevation of that part of the preferred embodiment which is directly under the chock plates.

As shown in FIG. 4, the unloaded system has the chock plates level with or flush in roadbed 1. The position of load supports 10 and the lengths of arms 15, 15A, and 26A are so chosen that when platform 2 rests on load supports 10 chock plates 6 are pushed against wheels 7. The strength and position of spring 21 are chosen such that unloaded platform 2 is sufficiently raised to permit adequate lever motion in the system to push chock plates 6 against wheels 7 when load is applied and to permit chock plates 6 to rest in the roadbed 1 when no load is applied.

The size and position of dolly platform 2 is chosen such that the dolly wheels of any semi-trailer 4 will come to rest on it when the semitrailer is in position against loading platform 5. Since, depending on the size of the semi-trailer, dolly wheels are usually between 25 and 28 feet from the center of the wheel truck, a five foot long dolly platform, with its center about 27.5 feet from the center of the chockplates should effectively provide for all semi-trailers. The dolly platform should be any convenient width big enough to allow the dolly wheel or wheels to rest upon it, from two to five feet. It should be laterally centered.

CONSTRUCTION VARIATIONS

The dolly platform 2 is preferably a concrete block. Most truck yards, being paved with macadam, have a concrete block in the position where dollys rest to save wear and tear, and dolly platform 2 merely replaces it. It can also be a steel plate, although this tends to be heavy. However an alternate construction, described below, would conveniently use such a plate. The use of wood is possible although subject to excessive wear. The dolly platform 2 must be freely movable, by which is meant that there is no connection to the road bed or any other part of the structure except through the platform bar to the lever system.

An alternate construction which may prove preferably when installing the self-locking chock of this invention in an existing truck yard would be (shown in FIG. 5) a platform composed of a horizontal steel plate supported by one or more platform bars 14A passing through holes 33 drilled in the existing concrete pad in the roadbed. If only one bar is used, it is directly pivotably attached to the dolly lever arm 15 in the dolly pit which has been dug out from the side under the existing truck lane roadbed. If more than one platform bar 14A is used, a horizontal platform bar support 35 should rigidly join all of them in the dolly pit and have the dolly bar 14 attached to it. The roadbed 1 itself, especially the concrete dolly pad flush in it, becomes the load support 10.

All the bearing surfaces should preferably be coated with polytetrafluoroethylene (sold under trademark TEFLON) surface. All load bearing pivots and journals, as well as the lines of the tube in which the pit connection rod moves, should have grease fittings and be made of material which can be greased.

The pit connection rod should be made of unwelded disconnectable unit sections in order to allow for easy construction and repair. The tube through which it passes is conveniently drilled through the dirt by well drilling equipment operating horizontally and should be lined by polyvinyl chloride piping, to which flanges can be screwed or bolted on either end. The use of PVC piping (of size known as 80 Schedule) is preferred because it is as strong as steel and will weather better. If it is used, the pit connection rod 17 need not be TEFLON coated.

The positioning means for holding the dolly platform 2 off the load supports 10 and in position for receiving a dolly wheel 3 is shown in the drawings as a spring around the pit connection rod 17, operating as a compression spring between flange 19 and spring plate 20. The latter is affixed by weld or snap-ring to rod 17. Alternative means will be obvious to one skilled in the art. They could include hydraulic systems operation; either directly on platform 2 or at a selected place in the lever system. Another alternative is to have a spring between load support 10 and platform 2, either as the sole positioning means or as an assistant to the spring shown in the Figures. Generally, springs would be cheaper.

Figure 2:
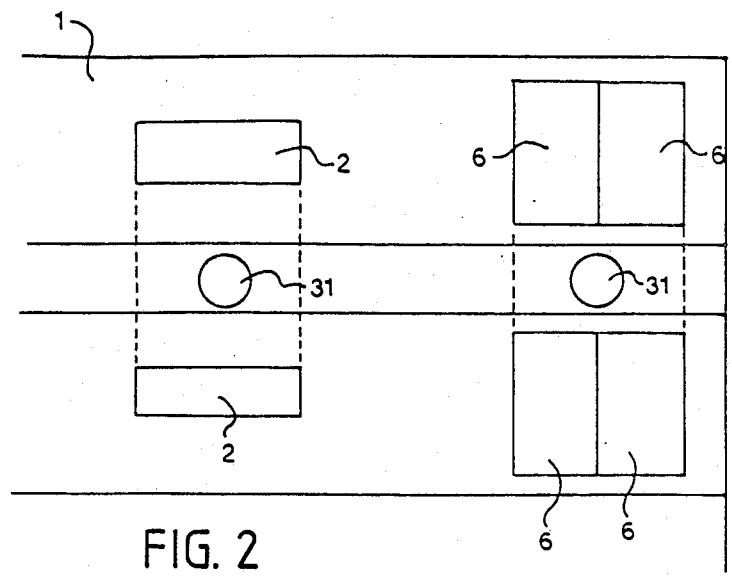
FIG. 2 is a top plan view of two adjacent lanes in a truck yard by a loading platform showing the location of the external portions of the mechanism and the access manholes for servicing the mechanism.

Pits 11 and 22 should preferably be lined with concrete or wood. The floors 13 and 24, preferably concrete, should be heavy enough to permit fastening of lever supports 12 and 23 in a convenient manner such as bolting. A means of physical access to these pits to permit original construction of the lever system and repairs as needed is highly desirable. Usually access should be through a repair pit to one side of the truck lane, reached via a manhole. In FIG. 2 a convenient arrangement is shown with access pits between two lanes, servicing both chock lever mechanisms.

Figure 3:
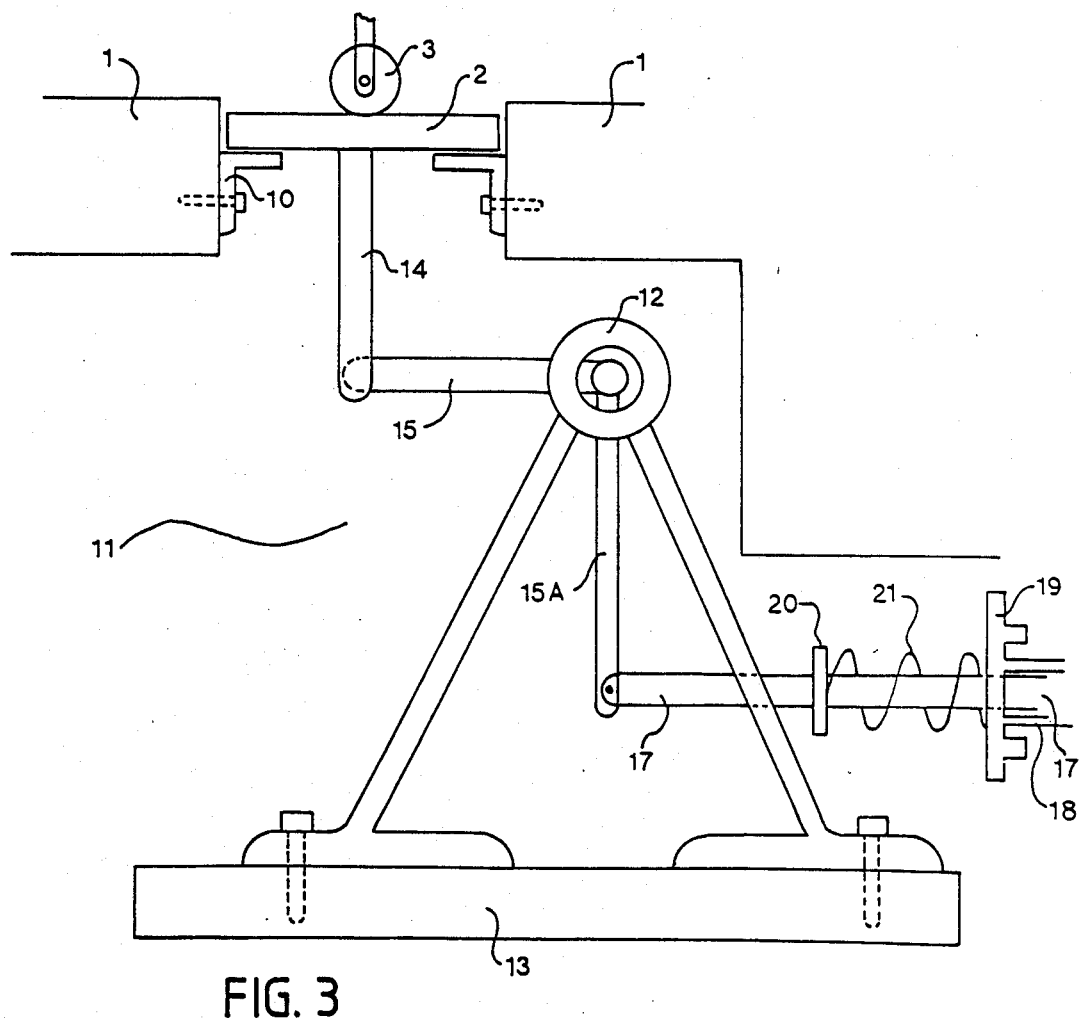
FIG. 3 is a detailed side elevation of that part of the preferred embodiment which is directly under the trailer dolly.
Figure 5:
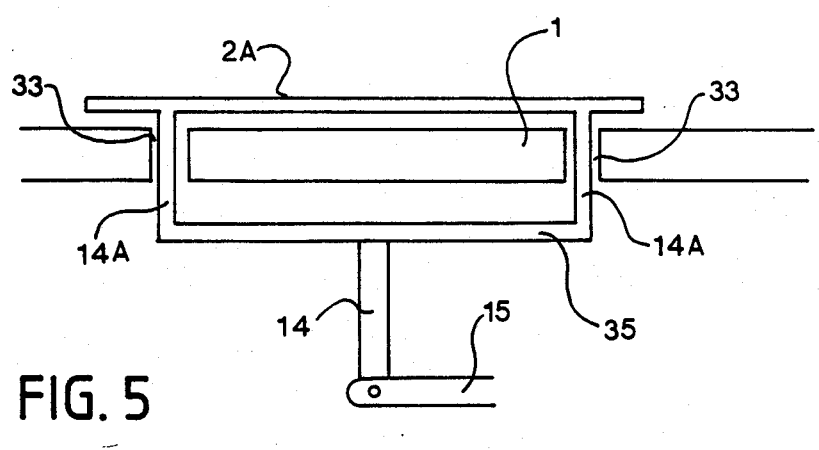
FIG. 5 is a partial sectional elevation of a modified dolly platform.

The load supports 10 need not be angle irons bolted to the sides, as shown in FIGS. 1 and 3. Any convenient structure or configuration of the pit which can carry the load will suffice. In FIG. 5 is shown the use of the roadbed itself.

It is important to construct the levers to get sufficient mechanical magnification of the thrust of chock bar 28 that it can raise chock plates 6 against the wheels 7. This is achieved by selecting the lengths of arms 15 and 15A and 26 and 26A such that 15A is larger than 15 and 26A is larger than 26. A convenient four fold magnification is achieved by having each of 15A and 26A twice as long as 15 and 26, respectively, which imparts to bar 28 a rise of four inches for every inch bar 14 drops.

A further mechanical advantage is obtained from the position of rollers 30 on chock plates 6 since depending on the length of chock support 29, a vertical rise in said rollers results in a much large rise of the free edges of the chock plates. Chock supports 29 can be constructed so that the position of rollers 30 can be adjusted.

The rollers 30 are shown in the Figures as extending the width of plates 6. However, since there is no heavy load on them except the weight of plates 6, they can just as well be any convenient combination of wheels, hence the definition as cylindrical rotatable members. The chock bar 28 should be rigidly fastened to chock support bar 29, to which rollers 30 are fasten and the lever system should keep the rollers 30 in contact with plates 6. The chock support bar 29 and chock bar 28 can be considered as a chock support means and variations in said means can be made as needed to support various arrangements of chock plates.

Chock plates 6 are shown as extending across the entire width of the truck lane, contacting wheels on both sides of the semi-trailer. However, the arrangement of the lever system in the chock plate pit could permit use of multiple pairs of chockplates, one for each side. The chock plates are set in the truck lane at such a position that a semi-trailer parked with its rear platform at a normal distance from the loading platform will have its wheels approximately centered over the meeting free edges of the plates. In general, the plates should lie with the pivoted edge close enough to the wheel resting position that the plate, upon pivoting under the thrust of the rollers, will contact the wheel. The width of the plates should be over one foot and preferably 18 to 24 inches from the pivoted edge 8 to the free edge 9. Another, but more complicated chock plate arrangement would have the chock plates separated from one another by a space for a wheel to come to rest and have the pivoting reversed, so that the plates would rise ahead and behind the wheel and block its movement. This arrangement would require a more complicated lever system in the chock lever pit.

The inventive concept embodied herein need not be restricted to a permanent installation below ground in a truck yard. The self-locking chock can be constructed as a portable mechanism usable on any parking place for any trailable vehicle. In such a variation, both the dolly platform 2 and chock plates 6 would extend to one side of the portable housing for the connecting lever means. The dolly platform bar 14, instead of extending downward from platform 2 would extend horizontally from the platform 2 into the portable housing where it would be pivotally connected to the short arm 15 of the dolly lever 16 at a horizontal angle instead of a vertical angle. Depression, under load, of platform 2 to the roadbed 1 (which again is acting as the dolly load support 10) causes the whole bar 14 to move in a vertical direction at right angles to its length. This, however, actuates the portably housed lever means. Similarly, at the other end of the lever means, the chock bar 28, instead of extending vertically upwards from the long arm 26A of chock lever 25, extends horizontally outward to the chock plates 6. In this embodiment the rollers 30 are actually the common pivot of both plates 6, running along the adjoining edges of the plates. As this pivot is raised (the chock bar 29 being raised vertically in a direction at right angles to its length) this common pivoted edge of plates 6 is raised, causing the plates to assume an inverted V configuration between the semi-trailer wheels to form the chock.

What is claimed:

1. An automatically self-locking chock for a conventional trailer having a plurality of wheels at a rearward end of the trailer and a dolly support for a forward end of the trailer, said chock comprises in combination
   (a) a freely movable dolly platform above a load support means;
   (b) at least one pair of pivoted chock plates at a distance from said platform such that the dolly support for the forward end of said trailer will rest on said platform when said chock plates are positioned next to the wheels of said trailer;
   (c) lever means connecting said platform to said chock plates, constructed such that when said platform carries a load and is pressed against said load support means said chock plates are pivoted upward against the treads of said trailer wheels by mechanical magnification of the downward movement of said platform; and (d) positioning means for holding said lever means, when said platform is unloaded, in a position such that said chock plates are parallel to and approximately in the plane of the roadbed on which the trailer rests and said dolly platform is positioned above and away from said load support means.

2. An automatically self-locking chock for a conventional semi-trailer having a plurality of wheels at a rearward end of the trailer and a dolly for a forward end of the trailer, said chock comprises in combination:

(a) a freely movable dolly wheel platform;
  (i) said platform being set in the lateral center of the roadbed of a truck yard and occupying the area of said roadbed where a dolly of a parked semi-trailer normally rests;
  (ii) said platform being positioned above a dolly platform pit having rigidly affixed load support means set to limit vertical movement of said platform;
  (iii) said platform having at least one vertically positioned platform bar affixed to its underside;
(b) at least one pair of pivoted chock plates;
  (i) said plates being set horizontally in the plane of said roadbed above a chock plate pit beneath said roadbed;
  (ii) each said chock plate being pivoted along one edge on an axis perpendicular to the length of a parked semi-trailer;
  (iii) said plates being positioned in relation to said dolly platform such that the pivoted edge of each said plate lies laterally across the parked semi-trailer's position at a distance from said platform permitting said plates to contact the wheels of said semi-trailer when pivoted upward;
  (iv) said plates having a minimum width of one foot between said pivoted edge and said free edge;
(c) cylindrical rotatable members in contact with each said chock plate;
  (i) the axis of rotation of said members being parallel to the axis of pivoting said plates;
  (ii) each said members being mounted on a freely movable chock support means
(d) a freely movable lever means connecting said platform bar in said dolly pit with said chock support means in said chock plate pit;
  (i) said lever means being pivotably and journalably mounted such that downward movement of said platform bar is mechanically converted into magnified upward motion of said chock support means;
  (ii) said lever means being constructed such that when said dolly platform rests on said load support means under load of a semi-trailer, said rotatable members and said chock support means have pushed said chock plates pivotably upward against the wheels of said semi-trailer; and
(e) positioning means for holding said lever means, when said dolly platform is unloaded, in a position such that said chock plates remain parallel to and approximately in the plane of said roadbed and said platform is a short distance above said load support means.

3. The device of claim 1 in which said load support means consists of angle brackets affixed to the side of said platform pit.

4. The device of claim 1 in which said load support means is said roadbed and said platform bar passes through holds in said roadbed into said platform pit.

5. The device of claim 3 in which more than one platform bar is attached to said platform and are affixed in said platform pit to a horizontal platform support having a platform bar attached to its underside and pivotably attached to said lever means.

6. The device of claim 1 in which said lever means comprises
  (a) a dolly lever support rigidly mounted in said dolly platform pit;
  (b) an unsymmetrically armed angled shaped dolly pit lever having a short arm and a longer arm, and journalled at the union of said dolly lever arms in said support;
  (c) the short arm of said dolly lever being pivotably connected to said platform bar;
  (d) a pit connecting rod freely moving between said dolly platform pit and said chock plate pit;
  (e) said pit connecting rod being pivotably affixed at the dolly pit end to the longer arm of said dolly pit lever;
  (f) a chock plate lever support rigidly mounted in said chock plate pit;
  (g) an unsymmetrically armed angled chock lever having a shorter arm and a longer arm, and journalled at the union of said chock lever arms, in said chock support;
  (h) the chock pit end of said pit connection rod being pivotably affixed to the shorter arm of said chock lever; and
  (i) the longer arm of said chock lever being pivotably affixed to said chock bar.

7. The device of claim 1 in which said positioning means comprises a compression spring, mounted in said dolly platform pit around said pit connecting rod between a flange affixed to the wall of said platform pit and a plate affixed to said connecting rod.

* * * * *